United States Patent [19]
Kim

[11] Patent Number: 5,852,482
[45] Date of Patent: Dec. 22, 1998

[54] TFT ARRAY OF LIQUID CRYSTAL DISPLAY WHERE DATALINE AND SOURCE ELECTRODE PROJECTING THEREFROM CROSS GATE LINES AT ONLY TWO POINTS AND REPAIR METHOD THEREOF

[75] Inventor: Dong-Gyu Kim, Suwon-si, Rep. of Korea

[73] Assignee: Samsung Electronics Co., Ltd., Kyungki-do, Rep. of Korea

[21] Appl. No.: 702,013

[22] Filed: Aug. 23, 1996

[30] Foreign Application Priority Data

Aug. 23, 1995 [KR] Rep. of Korea .................. 1995-26167

[51] Int. Cl.$^6$ .................. G02F 1/136; G02F 1/1343; G02F 1/13; H01L 29/04
[52] U.S. Cl. .................. 349/46; 349/145; 349/192; 349/38; 349/43; 257/59; 257/72
[58] Field of Search .................. 349/42, 43, 38, 349/39, 55, 192, 145, 139; 257/59, 72, 38, 39, 46

[56] References Cited

U.S. PATENT DOCUMENTS

| | | |
|---|---|---|
| 5,028,122 | 7/1991 | Hamada et al. .................. 349/38 |
| 5,132,819 | 7/1992 | Noriyama et al. .................. 349/55 |
| 5,151,806 | 9/1992 | Kawamoto et al. .................. 349/39 |
| 5,182,661 | 1/1993 | Ikeda et al. .................. 349/42 |
| 5,260,818 | 11/1993 | Wu .................. 349/55 |
| 5,302,987 | 4/1994 | Kanemori et al. .................. 349/42 |
| 5,335,102 | 8/1994 | Kanemori et al. .................. 349/55 |
| 5,339,181 | 8/1994 | Kim et al. .................. 349/38 |
| 5,424,857 | 6/1995 | Aoki et al. .................. 349/38 |
| 5,434,686 | 7/1995 | Kanemori et al. .................. 349/55 |
| 5,745,090 | 4/1998 | Kim et al. .................. 349/39 |
| 5,760,857 | 6/1998 | Yanagawa et al. .................. 349/109 |
| 5,996,566 | 12/1997 | Kim et al. .................. 349/38 |

*Primary Examiner*—William L. Sikes
*Assistant Examiner*—Tarifur R. Chowdhury
*Attorney, Agent, or Firm*—Pillsbury Madison & Sutro LLP

[57] ABSTRACT

A thin film transistor (TFT) array panel of a liquid crystal display and a repair method thereof which can easily repair short between a gate line and a data line, and open of a gate line. The TFT array panel of a liquid crystal display includes a plurality of gate lines, a plurality of data lines, a thin film transistor device, a gate electrode, and a storage electrode.

19 Claims, 4 Drawing Sheets

TFT ARRAY OF LIQUID CRYSTAL DISPLAY WHERE DATALINE AND SOURCE ELECTRODE PROJECTING THEREFROM CROSS GATE LINES AT ONLY TWO POINTS AND REPAIR METHOD THEREOF

BACKGROUND OF THE INVENTION

A. Field of the Invention

The present invention relates to a thin film transistor (TFT) array panel of a liquid crystal display and a repair method thereof.

B. Description of the Prior Art

Generally, a liquid crystal display includes two panels and liquid crystal therebetween. One of the panels is a thin film transistor array panel, which has a plurality of pixel electrodes, switching elements connected to the pixel electrodes, data lines for transmitting a picture information signal to the pixel electrodes through the switching elements, gate lines for transmitting a driving signal to the switching elements. The other of the panels is a common electrode panel having color filters and a common electrode.

Hereinafter, the conventional TFT array panel of a liquid crystal display is described in detail with reference to the accompanying drawing.

FIG. 1 is a plan view illustrating the conventional TFT array panel of a liquid crystal display.

Referring to FIG. 1, a pair of gate lines 14 and 15, which are connected by storage electrodes 16, are formed on a substrate (not shown). The gate lines 14 and 15 are horizontal and parallel to each other, and a portion of the gate line 15 is a gate electrode 12. One of the storage electrodes 16 is perpendicular to the gate lines 14 and 15, while the other of the storage electrodes 16 having portion parallel to the gate lines 14 and 15 and portions perpendicular to them.

The gate lines 14 and 15 and the storage electrodes are covered with a gate insulating layer (not shown). On the gate insulating layer, a data line 26, a source electrode 22 connected to the data line 26, and a drain electrode 24 are formed. The data line 26 is perpendicular to the gate lines 14 and 15, and the source and the drain electrodes 22 and 24 are overlapped with and symmetrical about the gate electrode 12.

Between the gate electrode 12 and the source and the drain electrodes 22 and 24 and between the gate line 15 and the data line 26, there are an amorphous silicon layer 25 and an n+ amorphous silicon layer. The gate, the source and the drain electrodes 12, 22 and 24, and the amorphous silicon layer 25 are elements of the TFT.

A pixel electrode 30 is formed in the region defined by the gate lines 14 and 15 and the storage electrodes 16, and overlapped with them.

The conventional TFT array panel of a liquid crystal display has the following disadvantages.

First, as a data wiring including the data line 26, the source electrode 22 and the drain electrodes 24 becomes closer and, moreover, overlapped with the pixel electrode 30, due to the horizontal misalignment, the difference in the capacitance of the pixel electrode 30 and the data wiring between the pixels becomes larger, since lengthy portions of them are adjacent to each other. Then, the degradation of screen quality becomes larger. In addition, since the overlapped area of the gate electrode and a source electrode varies with the degrees of the longitudinal alignment, attention should be paid to the longitudinal alignment, as well as the horizontal alignment.

Second, there are three cross points of the gate line 14 and 15 and the data wiring in one pixel. Two of them are the cross points C and D of the two gate lines 14 and 15 and the data line 26, and the other is the overlapped portion B of the source electrode 22 and the gate line 15. The gate lines 14 and 15 and the data line 26 are easy to short-circuit at the cross points. When testing the liquid crystal display, it is possible to detect the short-circuited pixel but it is not possible to find the exact position at which the short occurred among the three points. Accordingly, the conventional TFT array panel has the disadvantage in that each point is selected by experimental probability, and the gate lines 14 and 15 in both ends of a cross point are cut off, thereby separating the short-circuited point from the gate lines 14 and 15. In addition, as the space between the storage electrode 16 and a data line 26 decreases, when the gate lines 14 is cut off by laser, the possibility that the pixel electrode 30 and the gate line 14 and 15 is shorted becomes larger since light invades even the pixel electrode 30.

Third, since the source and drain electrodes 22 and 24 are parallel to the gate line 15 which is horizontal, and the source electrode 22 is projected horizontally from the data line 26, the region A of the pixel electrode is small. Therefore, rubbing is difficult due to the step difference. In addition, since the source electrode 22 is projected horizontally from the longitudinal data line 26, the area of the projected portion is large. Therefore, the capacitance between the source electrode 22 and a common electrode of an opposite panel is large, thereby causing the degradation of the screen quality such as crosstalk.

SUMMARY OF THE INVENTION

Accordingly, the object of the present invention is to provide a thin film transistor (TFT) array panel of a liquid crystal display and a repair method thereof which can easily repair a short between a gate line and a data line, and open of a gate line to substantially obviate one or more of the problems due to limitations and disadvantages of the prior art.

To achieve the objects of the present invention and in accordance with the purpose of the invention, the TFT array panel of a liquid crystal display comprises:

a plurality of gate lines formed on a substrate at predetermined intervals;

a plurality of data lines formed vertically to the gate lines;

a thin film transistor device including a source electrode formed at a crossing portion of the gate lines and the data lines and projected from the data lines, a gate electrode in which a part of the gate lines is formed in parallel with the data lines near the crossing portion, and a drain electrode connected to a pixel electrode; and a storage electrode connected to the gate line and formed around the pixel electrode, and an insulating film formed therebetween.

The storage electrode is formed around the pixel electrode, and the storage electrode has a neighboring storage electrode as a connecting portion crossing the data lines. In addition, the storage electrode is bent at the connecting portion toward the pixel electrode, and the source electrode of the TFT is overlapped with a part of the gate lines.

According to another aspect of the present invention, a thin film transistor array panel of a liquid crystal display, comprises:

a pixel electrode on a substrate;

a plurality of gate lines formed at upper and lower parts of the pixel electrode;

a plurality of data lines formed vertically to the gate lines;

a thin film transistor having a gate electrode formed in parallel with the data lines at a crossing portion of the data lines and the gate lines formed at the upper part of the pixel electrode; and a storage electrode formed in parallel with the data lines and for connecting one or more gate lines formed at the upper and lower parts of the pixel electrode, and the pixel electrode and an insulating film being formed therebetween.

The storage electrode is formed around the pixel electrode, and the storage electrode has a neighboring storage electrode as a connecting portion crossing the data lines. In addition, the storage electrode is bent at the connecting portion toward the pixel electrode, and the source electrode of the TFT is overlapped with a part of the gate lines. A space between the storage electrode and the data lines is formed broader at the crossing portion of the gate lines and the data lines than at the other portions.

According to another aspect of the present invention, a repair method of a thin film transistor array panel of a liquid crystal display comprises the steps of:

separating from a gate wiring a gate electrode of a thin film transistor device including the gate electrode, a source electrode and a drain electrode in a thin film transistor array panel of a liquid crystal display in which the gate wiring is overlapped with a pixel by a predetermined interval; and shorting the source electrode and the drain electrode of the thin film transistor from the gate electrode respectively.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, illustrate one embodiment of the invention and, together with the description, serve to explain the principles of the invention.

DESCRIPTION OF THE PREFERRED EMBODIMENT

Reference will now be made in detail to a preferred embodiment of the present invention, an example of which is illustrated in the accompanying drawings.

Figure 2:
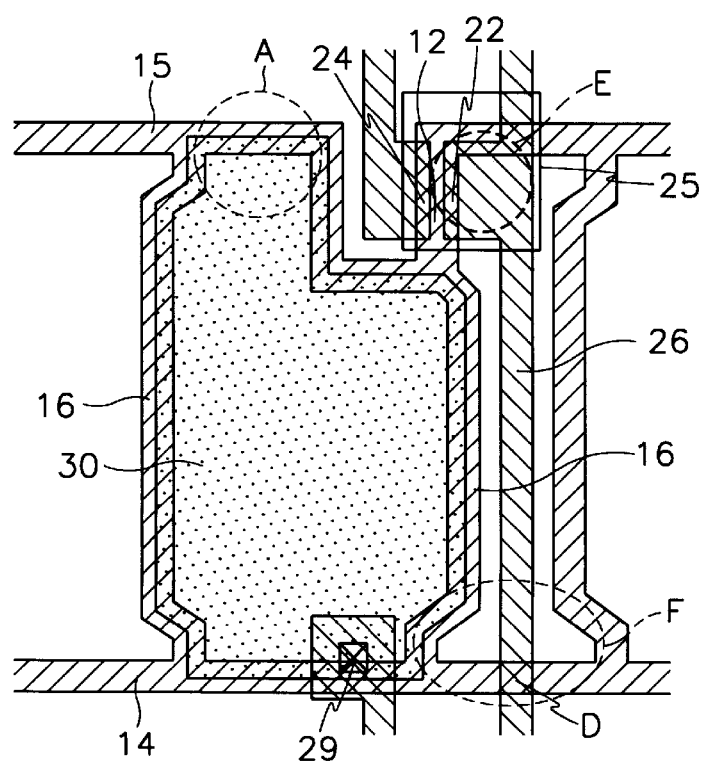
FIG. 2 is a plan view illustrating a TFT array panel of a liquid crystal display in accordance with a preferred embodiment of the present invention.

FIG. 2 is a plan view illustrating a TFT array panel of a liquid crystal display in accordance with a preferred embodiment of the present invention.

As shown in FIG. 2, a pair of gate lines 14 and 15, which are connected by storage electrodes 16, are formed on a substrate (not shown). A lower gate line 14 is straight, while an upper gate line 15 has portions parallel to the lower gate line 14 and portions perpendicular to it. One of the portions perpendicular to the lower gate line 14 is a gate electrode 12.

The gate lines 14 and 15 and the storage electrodes 16 are covered with a gate insulating layer (not shown).

A data line 26 perpendicular to the lower gate line 14, as well as a source and a drain electrodes 22 and 24, is formed on the gate insulating layer. The source and the drain electrodes 22 and 24 are overlapped with and symmetrical about the gate electrode 12. The overlapped portion E of the source electrode 22 and the gate line 15 is at the cross point of the gate line 15. A gate wiring including the gate lines 14 and 15 and the storage electrode 16 is farther from the data line 26 near the cross points of the data line 26 and the gate lines 14 and 15. That is, the gate electrode 12 and the portions of the storage electrodes 16 near the cross points of the data line 26 and the gate lines 14 and 15 are farther from the data line 26 than the other portions of the storage electrodes 16 are.

At the overlapped portions of the gate electrode 12 and a data wiring containing the data line 26, and the source and the drain electrodes 22 and 24, there are an amorphous silicon layer 25 and an n+ amorphous silicon layer between them.

A pixel electrode 30 is formed in the region defined by the gate lines 14 and 15 and the storage electrodes 16, and is overlapped with them.

Since the gate electrode 12 is longitudinal and the source electrode 22 and the drain electrode should be aligned along the gate electrode 12, only the horizontal alignment is a main concern. Since the distance of the source electrode 22 from the data line 26 is short, the horizontal length of the region A is long, thereby improving the rubbing treatment in the region A.

Figure 1:
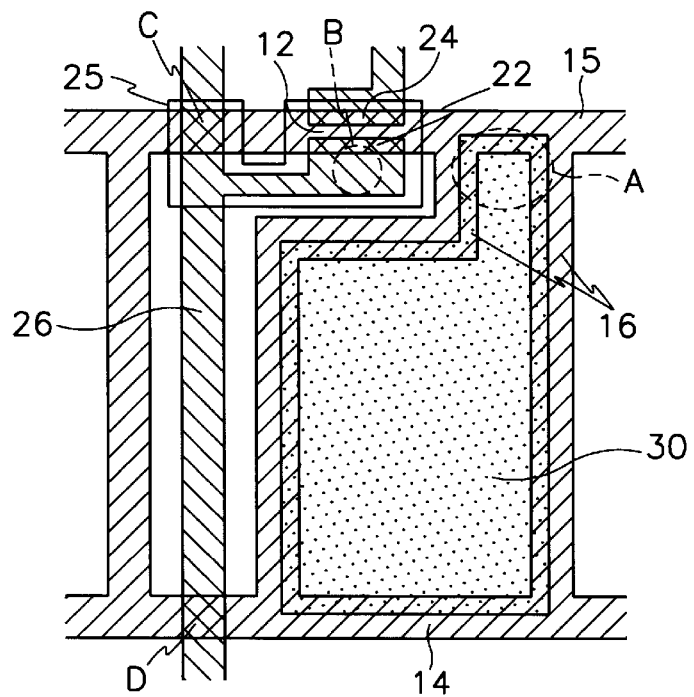
FIG. 1 is a plan view illustrating a conventional thin film transistor (TFT) array panel of a liquid crystal display.

Unlike prior art FIG. 1, there are only two crossing points E, F of the data wiring and the gate lines 14 and 15. Therefore, short point can be found more easily in the present embodiment than in the conventional art and thus any repair can be more easily completed.

Since the gate wiring and the pixel electrode 30 are farther from the data line 26 near the cross points of the data line 26 and the gate lines 14 and 15, the possibility that the pixel electrode 30 and the gate line 14 and 15 is shorted is reduced, and thus repair is easier.

Now, the method for manufacturing the TFT array panel according to the embodiment will be described with reference to FIGS. 3A to 3C.

Figure 3A:
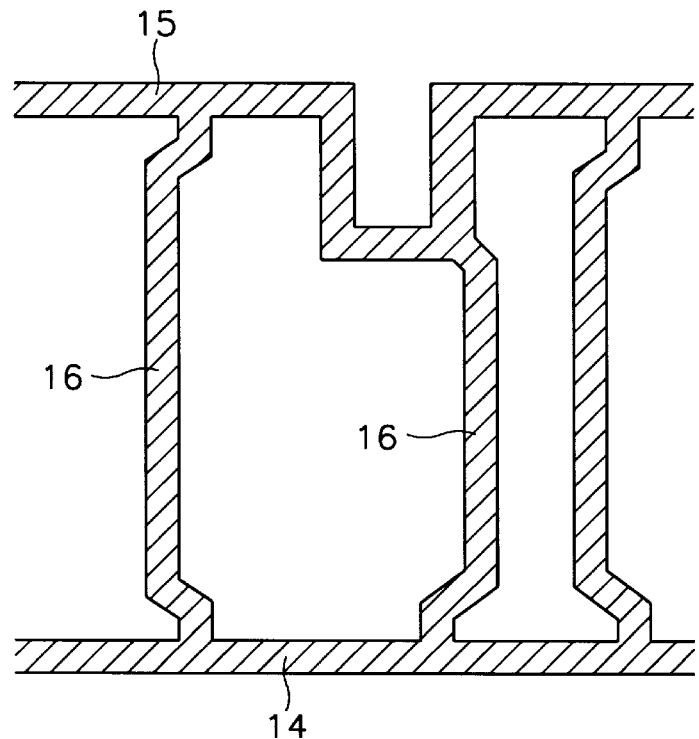
FIGS. 3A to 3C are plan views illustrating a process for forming a TFT array panel of a liquid crystal display in accordance with a preferred embodiment of the present invention.

Referring to FIG. 3A, a gate wiring including a gate electrode 12, gate lines 14 and 15 and storage electrodes 16 is formed by a conductive material such as Al, Ta or Cr on a substrate (not shown) made of a transparent insulating material. At this time, when the gate wiring is formed by the Al or Ta, a top the gate wiring may be anodized.

Next, an insulating layer of $SiN_x$ is formed on the gate wiring.

A semiconductor layer such as an amorphous silicon layer 25 is formed on the insulating layer, and an extrinsic semiconductor layer such as an $n^+$ amorphous silicon layer is formed on the amorphous silicon layer 25.

Figure 3B:
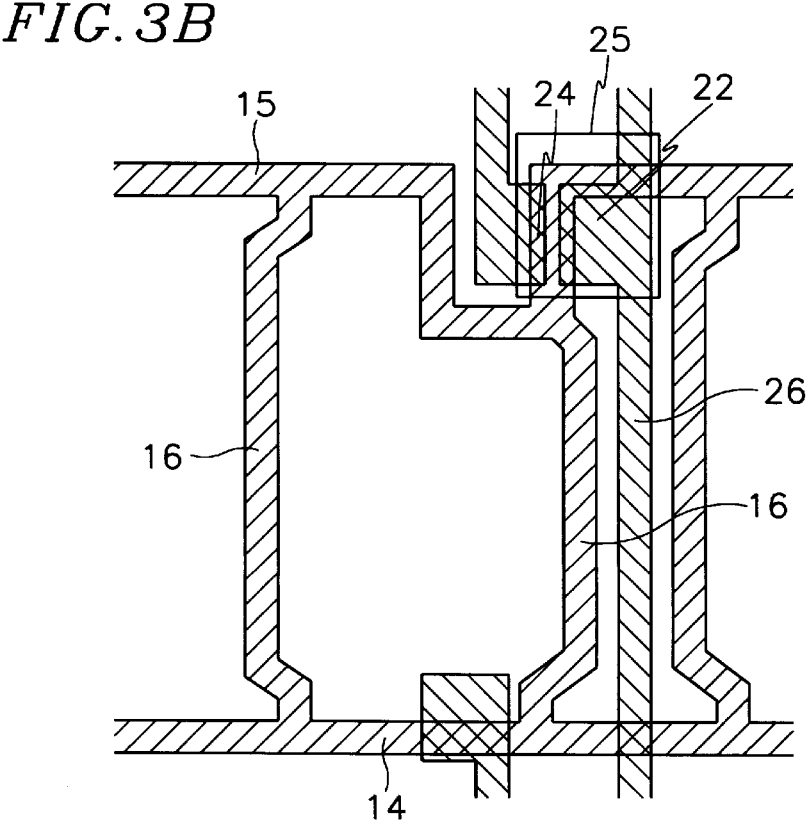

Next, referring to FIG. 3B, the $n^+$ amorphous silicon layer and the amorphous silicon layer 25 are patterned, and a data wiring including a data line 26, a source electrode 22 and a drain electrode 24 are formed by metal. The n+ amorphous silicon layer is etched using the data wiring as a mask.

Figure 3C:
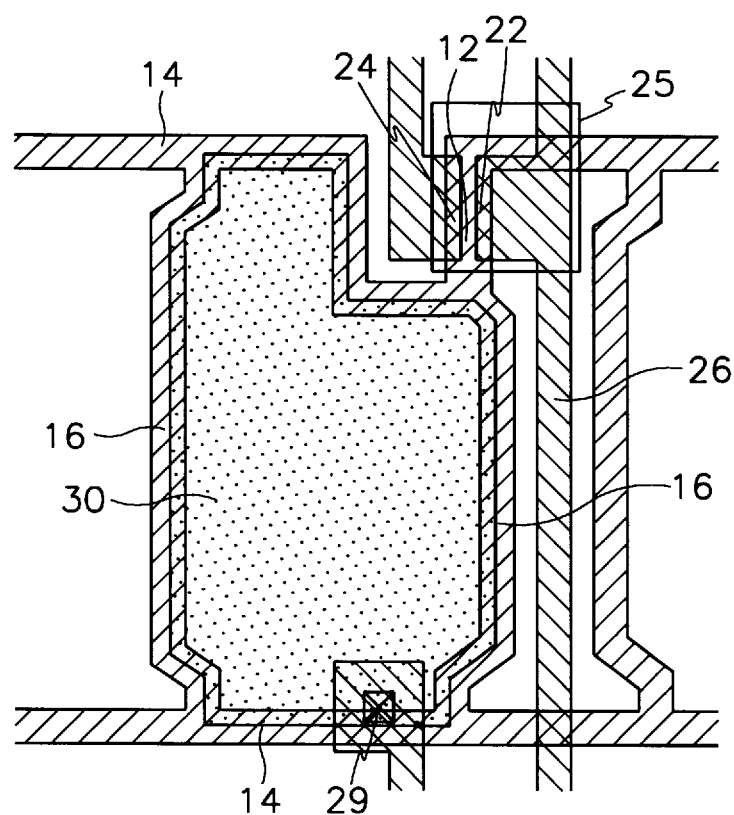

Referring to FIG. 3C, a passivation film (not shown) of SiN$_x$ is deposited and a contact hole 29 is formed by removing the portion of the passivation film on the drain electrode 24. Then, a pixel electrode 30 is formed by indium tin oxide (ITO) and connected to the drain electrode 24 through the contact hole 29.

Finally, a passivation film is formed on the data wiring.

Next, a repair method of the TFT array panel of a liquid crystal display in accordance with the preferred embodiment of the present invention is as follows.

Figure 4:
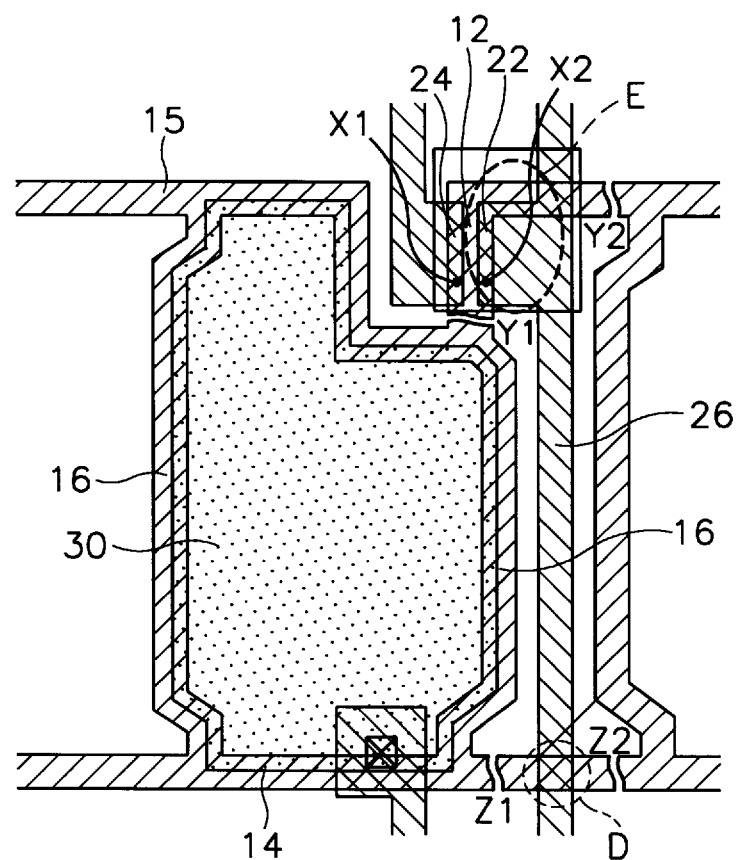
FIG. 4 is a plan view illustrating a repair method of a TFT array panel of a liquid crystal display in accordance with a preferred embodiment of the present invention.

FIG. 4 is a plan view illustrating a repair method of a TFT array panel of a liquid crystal display in accordance with the preferred embodiment of the present invention.

When at least one of the cross points D and E are shorted, the repairing is performed as follows.

When the cross point E is shorted, the points Y1 and Y2 of the upper gate line 15 in both ends of the TFT is cut off by laser to separate the shorted point of the gate line 15 from rest of the gate line 15, and the overlapped points X1 and X2 of the source and the drain electrodes 22 and 24 and the gate electrode 12 are shorted to apply data signals to the pixel.

When the cross point D is shorted, the points Z1 and Z2 of the lower gate line 15 in both ends of the cross point D is cut off by laser to separate the shorted point of the gate line 15 from the gate line 15.

As described above, the effect of the TFT array panel of a liquid crystal display and a repair method thereof in accordance with the preferred embodiment of the present invention lies in that an alignment construction of the gate wiring and the data wiring is improved, and the short between the gate line and the data line and the open of the data line may be easily repaired.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A thin film transistor array panel of a liquid crystal display, comprising:
    a pair of gate lines formed on a substrate;
    a storage electrode connected to both the gate lines;
    a data line crossing the gate lines via insulator;
    a pixel electrode; and
    a thin film transistor including a source electrode formed at a crossing portion of the gate lines and the data line and projected from the data line, a gate electrode in which a part of the gate lines is formed in parallel with the data line near the crossing portion, and a drain electrode connected to a pixel electrode;
    wherein the storage electrode has a neighboring storage electrode as a connecting portion crossing the data line.

2. The thin film transistor array panel of a liquid crystal display of claim 1, wherein the storage electrode is formed around the pixel electrode.

3. The thin film transistor array panel of a liquid crystal display of claim 1, wherein the storage electrode is bent at the connecting portion toward the pixel electrode.

4. The thin film transistor array panel of a liquid crystal display of claim 1, wherein the source electrode of the TFT is overlapped with a part of the gate lines.

5. A thin film transistor array panel of a liquid crystal display, comprising:
    a pixel electrode on a substrate;
    a plurality of gate lines formed at upper and lower parts of the pixel electrode;
    a plurality of data lines formed vertically to the gate lines;
    a thin film transistor having a gate electrode formed in parallel with the data lines at a crossing portion of the data lines and the gate lines formed at the upper part of the pixel electrode; and
    a storage electrode formed in parallel with the data lines and for connecting one or more gate lines formed at the upper and lower parts of the pixel electrode, and the pixel electrode and an insulating layer being formed therebetween;
    wherein the storage electrode has a neighboring storage electrode as a connecting portion crossing the data lines.

6. The thin film transistor array panel of a liquid crystal display of claim 5, wherein the storage electrode is formed around the pixel electrode.

7. The thin film transistor array panel of a liquid crystal display of claim 5, wherein the storage electrode is bent at the connecting portion toward the pixel electrode.

8. A thin film transistor array panel of a liquid crystal display of claim 5, wherein a source electrode of the TFT is overlapped with a part of the gate lines.

9. The thin film transistor array panel of a liquid crystal display of claim 5, wherein a space between the storage electrode and the data lines is formed broader at the crossing portion of the gate lines and the data lines than at the other portions.

10. A thin film transistor array panel of a liquid crystal display, comprising:
    a pair of gate lines formed on a substrate;
    a storage electrode connected to both the gate lines;
    a data line crossing the gate lines via insulator;
    a pixel electrode; and
    a thin film transistor including a source electrode formed at a crossing portion of the gate lines and the data line and projected from the data line, a gate electrode in which a part of the gate lines is formed in parallel with the data line near the crossing portion, and a drain electrode connected to a pixel electrode;
    wherein said data line and said source electrode projecting therefrom cross the gate lines at only two points.

11. The thin film transistor array panel of a liquid crystal display of claim 10, wherein the storage electrode is formed around the pixel electrode.

12. The thin film transistor array panel of a liquid crystal display of claim 10, wherein the storage electrode has a neighboring storage electrode as a connecting portion crossing the data line.

13. The thin film transistor array panel of a liquid crystal display of claim 12, wherein the storage electrode is bent at the connecting portion toward the pixel electrode.

14. The thin film transistor array panel of a liquid crystal display of claim 10, wherein the source electrode of the TFT is overlapped with a part of the gate lines.

15. A thin film transistor array panel of a liquid crystal display, comprising:
    a gate line which is formed on a substrate and has a concave portion;
    a date line crossing the gate line via insulator;
    a pixel electrode; and
    a thin film transistor including a gate electrode which is a part of the concave portion and is parallel to the data line, a source electrode which is formed at a crossing portion of the gate line and the data line and projected from the data line to the gate electrode, and a drain electrode which is connected to the pixel electrode without meeting the gate line except for the gate electrode.

16. The thin film transistor array panel of a liquid crystal display of claim 15, further comprising a storage electrode which is connected to the gate line and formed around the pixel electrode.

17. The thin film transistor array panel of a liquid crystal display of claim 16, wherein the storage electrode has a neighboring storage electrode as a connecting portion crossing the data line.

18. The thin film transistor array panel of a liquid crystal display of claim 16, wherein the storage electrode is bent at a connecting portion toward the pixel electrode.

19. The thin film transistor array panel of a liquid crystal display of claim 16, wherein the source electrode of the TFT is overlapped with a part of the gate line.

* * * * *